(12) United States Patent
Evans

(10) Patent No.: US 11,221,270 B2
(45) Date of Patent: Jan. 11, 2022

(54) METHOD AND APPARATUS FOR DETECTING SLOW LEAKS

(71) Applicant: Kevan M Evans, Corvallis, OR (US)

(72) Inventor: Kevan M Evans, Corvallis, OR (US)

( * ) Notice: Subject to any disclaimer, the term of this patent is extended or adjusted under 35 U.S.C. 154(b) by 389 days.

(21) Appl. No.: 15/906,976

(22) Filed: Feb. 27, 2018

(65) Prior Publication Data

US 2020/0209097 A1    Jul. 2, 2020

(51) Int. Cl.
*G01M 3/28* (2006.01)

(52) U.S. Cl.
CPC .................................. *G01M 3/2807* (2013.01)

(58) Field of Classification Search
CPC ............. G01M 3/2807; G01M 3/2846; G01M 3/2869; G01M 3/3254
See application file for complete search history.

(56) References Cited

U.S. PATENT DOCUMENTS

| 5,415,033 | A | * | 5/1995 | Maresca, Jr. | ....... | G01M 3/2807 73/40.5 R |
| 5,568,825 | A | * | 10/1996 | Faulk | ...................... | E03B 7/071 137/624.11 |
| 7,418,354 | B1 | * | 8/2008 | Greenlee | ............. | G01M 3/2807 702/51 |
| 2012/0031754 | A1 | * | 2/2012 | Shyu | ........................ | C25B 9/00 204/278.5 |
| 2013/0041019 | A1 | * | 2/2013 | Purschke | ................. | A61P 27/02 514/44 R |

\* cited by examiner

*Primary Examiner* — Suman K Nath

(57) ABSTRACT

An apparatus and method for detecting slow leaks in a pressurized fluid environment is disclosed herein. The apparatus is a combination of elements including a flow sensor, electronic memory, and electronic processor. The apparatus is positioned in the flow stream of fluid or other type of fluid. The apparatus is positioned downstream of a primary fluid supply source, but upstream of potential slow leak areas. The method analyzes flow change events to determine whether a slow leak is present or if normal water usage is occurring.

20 Claims, 7 Drawing Sheets

METHOD AND APPARATUS FOR DETECTING SLOW LEAKS

BACKGROUND OF THE INVENTION

The present invention pertains to an improved fluid leak detection method and apparatus. More particularly, the present invention is directed to a method and apparatus for detecting very slow leaks by comparing flow differences over time.

FIELD OF THE INVENTION

Fluid leaks in homes and businesses cause a tremendous amount of damage to structures and contents. Leaks generally occur from a burst fluid pipe or leaking faucets or fluid using appliances. If an occupant is present and the leak is easily visible, fluid damage can often be prevented. However, many leaks occur very slowly so that even if an occupant is present, the leaks may not be discovered until a very substantial amount of damage has been caused. It is not uncommon for an undetected leak to literally create havoc and require major reconstruction to return the building to a usable state. Moreover, leaks induce the growth of hazardous mold.

A number of published articles relate to an increasing rate of claims against insurance companies for fluid damage claims and the resultant increase in cost and difficulty in obtaining insurance for homes and businesses in which fluid leakage claims have previously been made. See, e.g., in Money magazine, April 2003, the article by Lisa Gibbs and the web sites:
http://www.iii.org/media/facts/statsbyissue/homeowners/
http://www.rmiia.com/Homeowners/fluid_damage.htm.

Other than a fire, perhaps the most catastrophic type of damage which can occur to a home or other building is damage due to fluid leakage from a broken or badly leaking fluid line. Since fluid supply lines may run throughout a house or other building, a leak may occur in the heart of the house or other building, and may result in extensive damage both to the structure and to the contents prior to the fluid supply being manually shut off.

The main causes of runaway fluid leakage are ruptured pipes, tubes or fittings; faulty washing machine hoses, fluid heaters, supply lines and other plumbing equipment; rusty or aging components, electrolysis, poor installation practices, poor quality materials, frozen pipes, tubes or hoses, earthquake activity and pressure surges. With so many different factors that can create plumbing failures and runaway fluid leaks, one can readily realize the need for a fluid leak detection method or apparatus. Flooding in a home or other building brings fluid damage resulting in extensive destruction and expense. Massive difficulties ensue in the wake of interior structural flooding as families and businesses must contend with problems including substantial loss of time, money and the home, office or other building involved.

In the prior art, there exists a number of devices which are designed to detect leaks, control flow and to act as a shutoff in the event of a leak. These devices generally fall into two major categories, namely the shock operated type and the flow or pressure operated type. The shock operated device is designed to shut off flow in the event of a major shock such as that of an earthquake or the like. Examples of such devices are found in Lloyd, U.S. Pat. No. 3,747,616, and Mueller, U.S. Pat. No. 3,768,497 and Pasmany, U.S. Pat. No. 4,091,831. These devices are all designed for use with gas lines and do not address the problem of breaks or leaks in the line downstream of the devices. In addition, the shock operated type of control valves do not address the problem of broken or leaking fluid or gas lines due to normal erosion or the possibility that someone has simply opened a faucet or line and has forgotten to close it. These types of control valves are also completely ineffective for addressing the problem of very slow leaks in a system; leaks that may be as slow as one or two drops over a very long period of time.

The second approach, which causes a shutoff of flow in the event of an overly large flow rate or an excess pressure change across the device, is illustrated, for example, by Frager, U.S. Pat. No. 2,659,383, Bandemortelli, U.S. Pat. No. 4,522,229, and Quenin, U.S. Pat. No. 4,665,932. All three of these devices are designed primarily for industrial applications and are large, complex and expensive and therefore, inappropriate for use in a home or other relatively small building. A simpler valve control device designed to cut off the fluid supply to a house or building is described in U.S. Pat. No. 4,880,030 entitled "Safety Flow Control Fluid Shutoff Device." This device detects a downstream plumbing break or leak by sensing a fluid pressure increase within the valve. This increase in fluid pressure forces a piston to block the outlet of the device, thereby stopping flow through the device. It should be understood that the terms, "valve control device," "control valves" and "flood control devices or valves" as used herein, are synonymous and interchangeable.

Control valves which detect a high rate of flow have many drawbacks. With these types of control valves, undesired shut-offs may occur because of a high rate of flow under normal service conditions due to increases of fluid or gas consumption during a given period or increases in population in a fluid main's area, for example. Furthermore, if a break occurs, a great amount of fluid might run away before the predetermined value of rate of flow has been reached to effectuate a valve shut-off.

Control valves which are pressure sensitive are also not reliable because there are many factors that can cause a change in fluid pressure, which does not necessarily mean that there is an overflow of fluid. For example, in a system where fluid mains are connected in any number and one of these mains breaks, the pressure head decreases swiftly not only on the broken main but also on all the other mains and the respective control valves which are connected to these mains may unnecessarily close at the same time. Also, if a pressure sensitive control valve is located in a high place and the upstream length of the main is great, the pressure differences due to gravitational forces can cause variations in the shut-off parameters, leading to possible shut-offs which are unnecessary and inconvenient to customers as well as to fluid supply companies.

The prior art valve control devices described above do not address the problem of a very slow leak in a closed system. There is no way for these devices to distinguish, say, a three-drop-per-hour leak in a plumbing line from everyday normal fluid use. Furthermore, these prior art valve control devices are unreliable in detecting gradual leaks that create gradual changes in pressure which may be undetectable by the device. Furthermore, these prior art devices are unreliable in detecting gradual leaks that create gradual changes in pressure which may be undetectable by the existing devices to date.

Thus, there clearly exists a need for an improved leak detection method or device that overcomes the deficiencies of the prior art devices and reliably eliminates the potential hazard of damage due to a fluid leak. Moreover, such a device is needed which has the capability to measure the flow change caused by an intermittent, very slow flow leak of liquid or gas and to detect whether a leak exists from analysis of fluid flow readings.

BRIEF SUMMARY OF THE PRESENT INVENTION

The present invention comprises an apparatus and method for detecting slow leaks in a pressurized fluid environment wherein fluids include liquids and gases. The apparatus is a combination of elements including a fluid flow sensor, electronic memory, and electronic processor. The apparatus is positioned in the flow stream of fluid or other type of fluid. The apparatus is positioned downstream of a primary fluid supply source, but upstream of potential slow leak areas. The apparatus is a combination of elements including a fluid flow sensor which is comprised of a check valve and a gallons-per-minute flow sensor, electronic memory, and an electronic processor.

The method analyzes fluid flow change events to determine whether a slow leak, or leak, is present in the fluid environment.

Slow leaks are typically characterized by increases in the fluid flow of a fluid within the environment over regular intervals. The present invention receives fluid flow change notifications from its fluid flow sensor and analyzes those changes to see if they correspond with the expected pattern of a slow leak. If the observed fluid flow change pattern approximates an expected slow leak pattern, a slow leak is determined to exist.

Figure 1:
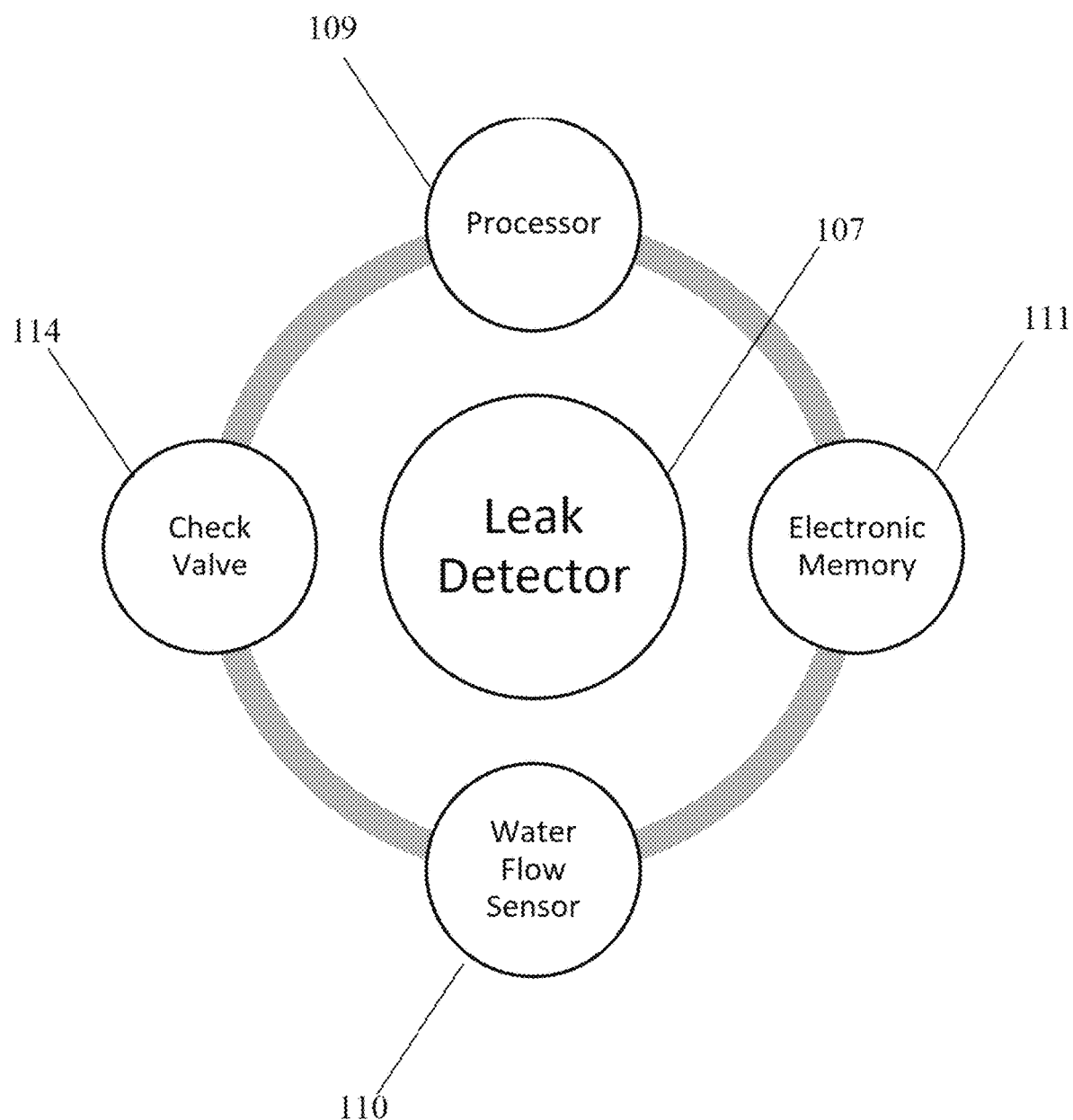
FIG. 1 is a block diagram showing the components of an apparatus for measuring slow leaks as according to an embodiment of the present invention.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method(s) or apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

For purposes of this Description, the term "fluid" shall include any substance that continually deforms or flows under an applied force. Fluids, as described herein, shall include, but not be limited to, liquids, gases, plasmas, or any other substance that cannot resist a shear force applied to it. Some examples of fluids include water, gasoline, oil, acids, hydrogen, oxygen, molten metals, or the like.

Referring to FIG. 1, there is shown an apparatus for measuring slow leaks (107) as according to an embodiment of the present invention. The apparatus (107) comprises a plurality of basic components: a fluid flow sensor (110) that measures the fluid flow change in a fluid pipe, a check valve (114) that creates a small pressure differential that when it pops open will create regular flow events of a detectable magnitude, an electronic processor (109) that executes machine-readable instructions, and an electronic memory (111) that contains the machine-readable instructions. In an embodiment of the present invention, the check valve (114) is a mechanism, including but not limited to a spring ball and detent, that opens and closes based on the pressure changes within the fluid pipe. This check valve mechanism (114) allows more fluid into the pipe when pressure in the pipe drops below a certain threshold.

The check valve (114) is set to open at an adjustable pressure threshold in a downstream portion of the fluid pipe. When the pressure in the downstream portion of the fluid pipe drops below the preset threshold, the check valve (114) opens allowing fluid to flow into the downstream portion of the fluid pipe. After a sufficient amount of fluid has flowed into the downstream portion of the pipe, pressure in the downstream portion exceeds the preset threshold and the check valve (114) closes. In an exemplary embodiment of the present invention, the preset threshold is approximately 73-75 lbs.

When the check valve (114) opens, a signal is transmitted from the sensor (110) to the electronic processor (109). The processor alters the physical configuration of the electronic memory (111) so that the signal event is stored in the memory (111). The signal event comprises at least the following two elements of information: the time of the event and a fluid flow measurement. In an embodiment of the present invention, the signal event could also contain the pressure within the fluid pipe before, during, and after the fluid flow sensor (110) was open.

The electronic processor (109) can also perform one or more machine-readable instructions upon the signal event or past signal events to determine whether the signal event indicates a slow leak. The machine-readable instructions reside within the electronic memory (111). In an embodiment of the present invention, the machine-readable instructions cause the processor (109) to change its physical configuration so that it executes any one or more of the following instructions: store signal event to electronic memory; compare the present signal event to at least one previous signal events; determine whether the comparison indicates a slow leak is present. In the second step, comparing the present signal event to at least one previous signal events, the comparison can be based on any one or more of: the time between the signal events, the duration the check valve (114) was open during the first and second events, or the amount of fluid flow during the first and second signal events. In an embodiment of the present invention, a slow leak is determined to exist if the comparison between the amount of fluid flow during a first, second and a third signal event indicates the flow amount or rates are approximately the same. The interval can be a predetermined number of seconds, minutes, hours, days, or weeks.

In an embodiment of the present invention if the time between the first signal event and second event is one day, and the time between the second signal event and third signal event is also one day, and the time the check valve (114) was open during those three events is approximately the same, a slow leak is determined to exist. Similarly, if the amount fluid that flowed through the fluid flow sensor (110) during those events is relatively similar, then a slow leak is determined to exist. When a slow leak is determined to exist, an alert is generated and transmitted to a user. The alert can take the form of a computer message, text message, audible sound, or other type of audio or visual indicator as per the specific embodiment.

A slow leak can also be determined to exist by comparison of any plurality of signal events exceeding two.

Figure 2:
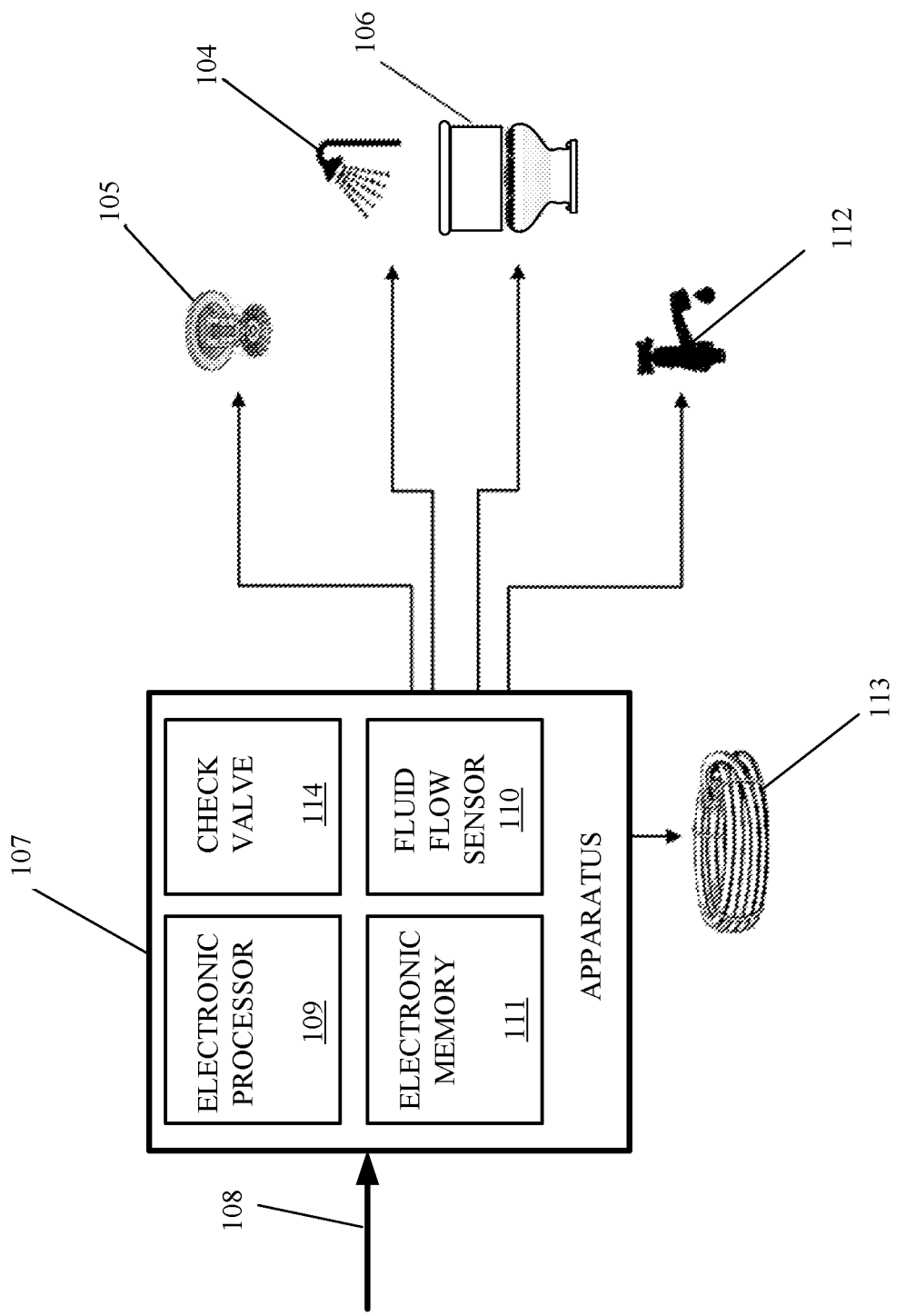
FIG. 2 shows an apparatus for measuring slow leaks positioned in a flow stream of fluid for a residence as according to an embodiment of the present invention.

Referring now to FIG. 2, there is shown the apparatus (107) positioned in a flow stream of fluid for a residence or commercial facility as according to an embodiment of the present invention. The apparatus (107) is positioned downstream of a primary fluid supply line (108) such as a city fluid pipe, a well pump, a fluid collection reservoir, or the like. Fluid from the supply line (108) passes through the apparatus (107) then to fixtures within the residence. Typical fixtures within the residence to which fluid ultimately flows can include, but is not limited to, sprinklers (105), showers (104), toilets (106), faucets (112) or slow leaks in a hose (113). It should be noted that sprinklers (105) can include fire suppression sprinklers as well as lawn or garden irrigation sprinklers. It should also be noted that the slow leak (102) illustrated in this figure is shown as a leaky faucet (112) for illustrative purposes only. Slow leaks may be present in any of the other fixtures (104-106, 113) or a fixture not pictured in this FIG. 2.

When a fixture (104-106, 112, 113) is turned on, or a slow leak occurs (102), fluid passes through the apparatus (107). A signal is sent from the apparatus' fluid flow sensor (110) to its electronic processor (109) and the steps for determining whether a slow leak exists mentioned above are performed.

Figure 3:
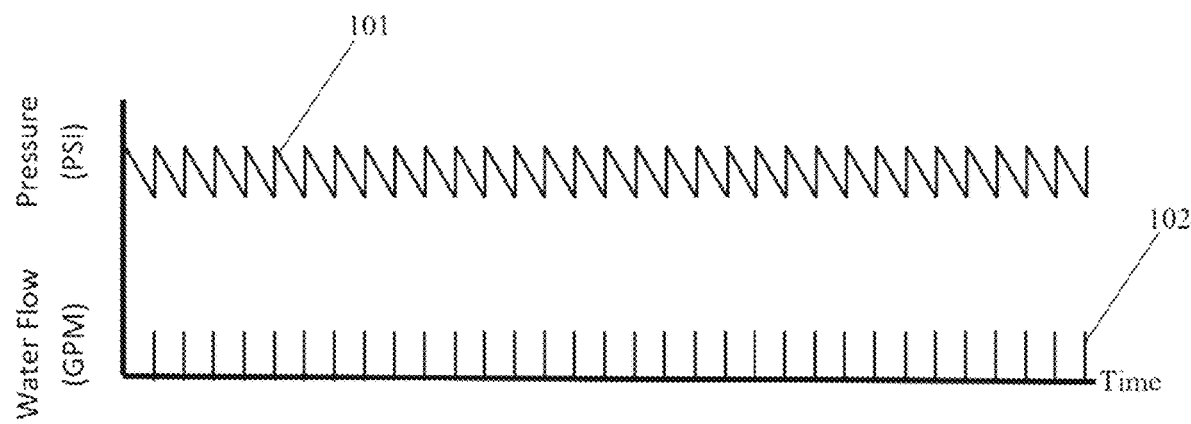
FIG. 3 is a graph showing fluid flow variations and slow leak events as according to an embodiment of the present invention.
Figure 4:
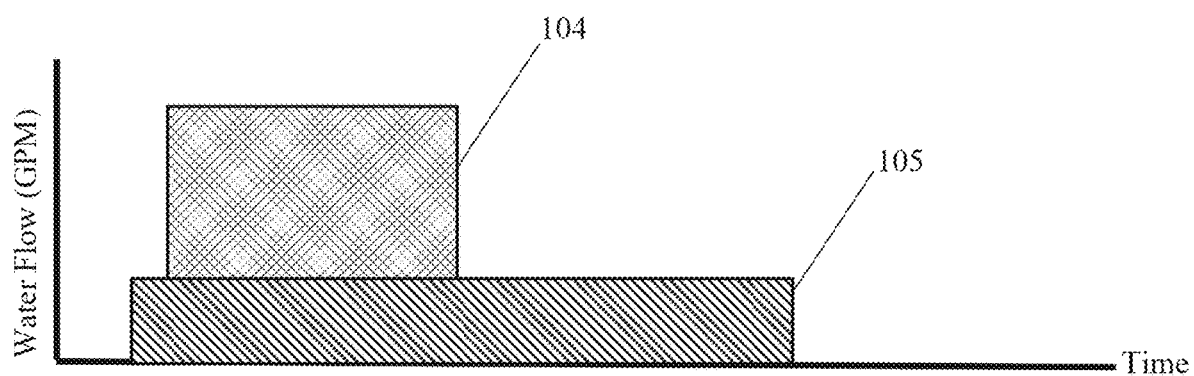
FIG. 4 is a graph showing fluid flow variations with exemplary shower and sprinkler events as according to an embodiment of the present invention.
Figure 5:
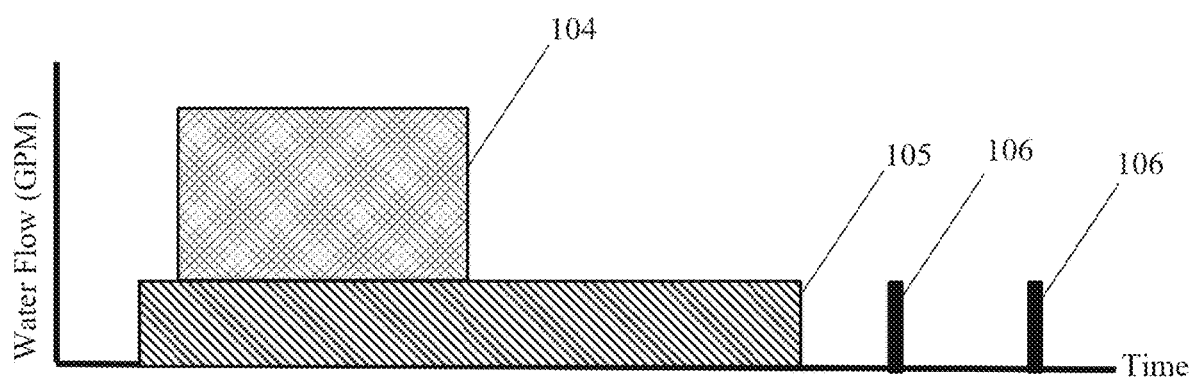
FIG. 5 is a graph showing fluid flow variations with exemplary shower, sprinkler and toilet flushing events as according to an embodiment of the present invention.
Figure 6:
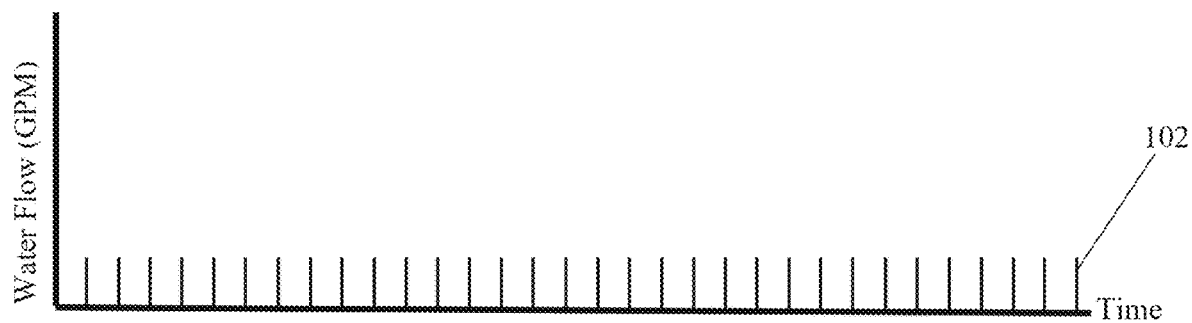
FIG. 6 is a graph showing fluid flow variations with an exemplary leak occurring as according to an embodiment of the present invention.
Figure 7:
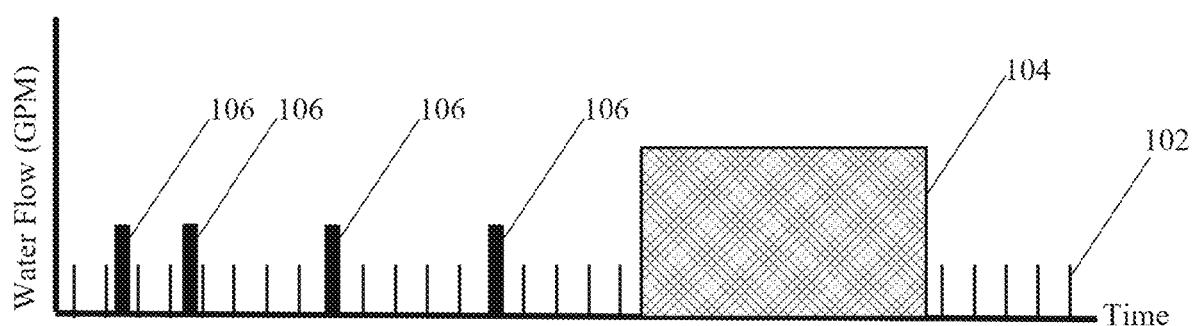
FIG. 7 is a graph showing fluid flow variations an exemplary leak, toilet flushes, and a shower event as according to an embodiment of the present invention.

Referring now to FIG. 3 is shown a graph of fluid flow variations due to slow leak (102) events as according to an embodiment of the present invention. It can be seen from the graphs that a slow leak (102) has a repetitive or otherwise consistent pattern that is detected by the present invention. When a slow leak (102) occurs fluid pressure (101) decreases over a certain amount of time. When a check valve (114) opens to restore fluid pressure (101), the pressure (101) returns to its starting point nearly instantaneously. The slow leak (102) then causes the fluid pressure (101) to drop over approximately the same amount of time and the process of the check valve (114) opening to restore pressure (101) repeats. The repetitive pattern of time between pressure (101) drops and the amount of flow is detected by the present invention and reported to a user as a slow leak (102)

Referring now to FIGS. 4-7 that will be discussed together, there are shown graphs of fluid usage events plotted as flow variation vs. time. Non-leak events can be seen as functions of flow vs. duration as sporadic, high volume fluid usages. By way of example, the operation of a shower (104) is a high volume but relatively short duration flow of fluid. The present invention is configured to distinguish between a shower event (104) and repetitive, lower intensity leak events (102).

Similarly, the use of fluid sprinklers (105) can be characterized by less flow variation than a shower event (104), but has a higher duration. The present invention distinguishes fluid sprinklers (105) from repetitive, lower intensity leak events (102).

A toilet flush (106) is a short duration, moderate flow change event, but occurs sporadically without the regularity that signifies leak events (102). The present invention is configured to distinguish between a toilet flush (106) and leak events (102).

Those skilled in the art will appreciate that the conception, upon which this disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example methods, apparatus, apparatus and articles of manufacture have been described herein, the scope of coverage of this application is not limited thereto. On the contrary, this application covers all methods, apparatus and articles of manufacture fairly falling within the scope of the invention either literally or under the doctrine of equivalents.

Therefore, the foregoing is considered as illustrative only of the principles of a method for creating assignments in an incident command system. Further, since numerous modifications and changes will readily occur to those skilled in the art, it is not desired to limit the method for creating assignments in an incident command system to the exact construction and operation described, and accordingly, all suitable modifications and equivalents may be resorted to, falling within the scope of the present invention. While the above description describes various embodiments of the present invention, it will be clear that the present invention may be otherwise easily adapted to fit other configurations.

As various changes could be made in the above constructions without departing from the scope of the invention, it is intended that all matter contained in the above description shall be interpreted as illustrative and not in a limiting sense.

What is claimed is:

1. An apparatus for detecting slow leaks comprising:
a fluid flow sensor;
an electronic memory;
an electronic processor; a check valve;
   wherein the fluid flow sensor is connected to the electronic processor, and detects changes in the fluid flow of fluid in a pipe;
   wherein the flow of fluid in the pipe occurs when the check valve is open and theflow of fluid stops when the check valve is closed;
   wherein the check valve opens with a pressure differential between an upstream side of the check valve and a downstream side of the check valve exceeds a threshold;
   wherein the check valve closes when the pressure differential returns to a starting value and is less than the threshold;
   wherein the electronic memory is connected to the electronic processor and stores signal event information for each one of a plurality of signal events detected by the fluid flow sensor;
   wherein the electronic memory stores signal event analysis instructions that are executed by the electronic processor;
   wherein the electronic processor, in response to executing the signal event analysis instructions, receives signal event information from the fluid flow sensor or the electronic memory for the plurality of signal events;
   wherein the signal event information comprises:
      at least one of fluid flow change information corresponding to an amount of fluid flow and a duration of the check valve being open; and
      a time at which the fluid flow sensor detected that the check valve was open; wherein the electronic processor executes signal event analysis on the received signal events to compare at least a first signal event information to a second signal event information and a third signal event information, and
   wherein the electronic processor determines occurrence of a slow leak when:
      the first signal event, second signal event, and third signal event have similar flow change information; and
      a first time between the first signal event and the second signal event, and a second time between the second signal event and the third signal event, are similar to each other;
   wherein during the first signal event, the check valve opens and nearly instantaneously returns the downstream pressure to the starting value to cause the check valve to close;
   wherein during the second signal event, the check valve opens and nearly instantaneously returns the downstream pressure to the starting value to cause the check valve to close, and
   during the third signal event, the check valve opens and nearly instantaneously returns the downstream pressure to the starting value to cause the check valve to close.

2. The apparatus of claim 1 wherein the check valve is a ball and detent device.

3. The apparatus of claim 1 wherein the check valve opens when the pressure in a downstream portion of the pipe falls below a threshold and closes when the pressure in the downstream portion of the pipe meets or exceeds that threshold.

4. The apparatus of claim 1 wherein the signal event analysis further comprises distinguishing between slow leaks and the fluid usage event.

5. The apparatus of claim 4 wherein the fluid usage includes at least one of a use of a shower, the use of a flushing of a toilet, or the use of sprinklers.

6. The apparatus of claim 1 wherein the slow leak is a slow leak of fluid in a residence.

7. A method for detecting slow leaks comprising:
generating information corresponding to a first signal event by a fluid flow sensorthat is attached to a pressurized fluid pipe, wherein the signal event includes a first time of the first signal event and first fluid flow data corresponding to at leastone of an amount of fluid flow and a duration that a check valve controlling flow through the pressurized fluid pipe was open,
   wherein the check valve opens with a pressure differential between an upstream side of the check valve and a downstream side of the checkvalve exceeds a threshold, and
   wherein the check valve closes when the pressure differential returns to a starting value and is less than the threshold;
transmitting the generated first signal event information to an electronic processor;receiving the first signal event information at the electronic processor;
performing analysis of the first signal event information to determine whether a slow leak is present downstream of the pressurized fluid pipe;
wherein the analysis comprises the steps, performed by the electronic processor:reading the first time of the first signal event;
   determining a first between time that is between the first time of the first signal event and a second time of a second signal event;
   determining a second between time between the second time of the second signal event and a third time of a third signal event;

reading the first fluid flow information of the first signal event; comparing the first between time and the second between time;

comparing the first fluid flow information of the first signal event to second fluid flow information of the second signal event;

comparing the first fluid flow information of the first signal event to third fluid flow information of the third signal event; and determining that a slow leak exists if the comparison indicates the first between time and the second between time are similar, and if the comparison indicates the first fluid flow information is similar to the second fluid flow information and to the third fluid flow information, wherein during the first signal event, the check valve opens and nearly instantaneously returns the downstream pressure to the starting value to cause the check valve to close;

wherein during the second signal event, the check valve opens and nearly instantaneously returns the downstream pressure to the starting value to cause the check valve to close, and during the third signal event, the check valve opens and nearly instantaneously returns the downstream pressure to the starting value to cause the check valve to close.

8. The method of claim 7 wherein the fluid flow sensor is attached wired or wirelessly to the electronic processor in a manner that allows for the transfer of electronic data between the fluid flow sensor and the processor.

9. The method of claim 7 wherein the fluid flow sensor generates a signal event when fluid flows through the pipe.

10. The method of claim 9 wherein fluid flows through the pipe after the check valve opens to allow additional fluid into the pipe.

11. The method of claim 7 wherein the pressurized fluid pipe is a pipe that can contain a liquid or a gas.

12. The method of claim 11 wherein the pressurized fluid pipe is connected to a plurality of plumbing fixtures that include at least one of a shower, sprinkler, toilet, hose or faucet.

13. The method of claim 11 wherein the slow leak can occur due to one of a plurality of plumbing fixtures or in an area of the pressurized fluid pipe that is not a plumbing fixture.

14. A method for detecting slow leaks comprising:
receiving first information corresponding to a first signal event at an electronic processor, wherein the first signal event information includes a first time of occurrence of the first signal event and at least one of a first duration that a check valve was open and a first amount of fluid flow occurring while the check valve was open,
wherein the check valve opens with a pressure differential between an upstream side of the check valve and a downstream side of the checkvalve exceeds a threshold, and
wherein the check valve closes when the pressure differential returns to a starting value and is less than the threshold;
receiving second information from at least one previous second signal event at the electronic processor, wherein the second signal event information includes a second time of occurrence of the second signal event and at least one of a second duration that the check valve was open and a second amount of fluid flow occurring while the check valve was open;
receiving third information from at least one previous third signal event at the electronic processor, wherein the third signal event information includes a third time of occurrence of the third signal event and at least one of a third duration thatthe check valve was open and a third amount of fluid flow occurring while the check valve was open;
comparing the received first information of the first signal event to the second event information of the previous second signal event and to the third event information of the previous third signal event,
wherein the comparison compares a time between the first signal event and the second signal event with a time between the second signal event and the third signal event; and
wherein the comparison compares at least one of:
the first duration, the second duration and the third duration of each signal event; and
the first amount of fluid flow, the second amount of fluid flow and the third amount of fluid flow of each signal event;
generating a slow leak alarm only if:
the time between the first signal event and the second signal event, and the time between the second signal event and the third signal event, are similar; and
the first duration, the second duration and the third duration are similar or the first amount of fluid flow, the second amount of fluid flow and the third amount of fluid flow are similar,
wherein during the first signal event, the check valve opens and nearly instantaneously returns the downstream pressure to the starting value to cause the check valve to close;
wherein during the second signal event, the check valve opens and nearly instantaneously returns the downstream pressure to the starting value to cause the check valve to close, and
during the third signal event, the check valve opens and nearly instantaneously returns the downstream pressure to the starting value to cause the check valve to close.

15. The method of claim 14 wherein the signal event is generated by a flow sensor attached to a pipe containing pressurized fluid.

16. The method of claim 14 wherein the electronic processor executes the further step of physically configuring an attached electronic memory to store the received signal event.

17. The method of claim 16 wherein the electronic memory is physically configured to store instructions executed by the electronic processor for comparing the received signal event and previous signal event.

18. The method of claim 17 wherein the electronic memory is physically configured to store the slow leak time and flow information.

19. The method of claim 14 wherein the method is executed in a residence or commercial facility.

20. The method of claim 14 wherein the first time of occurrence of the first signal event, the second time of occurrence of the second signal event, and the third time of occurrence of the third signal event all occur within one day.

* * * * *